United States Patent [19]
Lechner et al.

[11] Patent Number: 5,487,665
[45] Date of Patent: Jan. 30, 1996

[54] VIDEO DISPLAY SYSTEM AND METHOD FOR GENERATING AND INDIVIDUALLY POSITIONING HIGH RESOLUTION INSET IMAGES

[75] Inventors: Robert J. Lechner, St. Charles County; Harold R. Streid, St. Louis County, both of Mo.

[73] Assignee: McDonnell Douglas Corporation, St. Louis, Mo.

[21] Appl. No.: 331,418

[22] Filed: Oct. 31, 1994

[51] Int. Cl.[6] .............................. G09B 9/08; G09B 19/16
[52] U.S. Cl. ........................ 434/44; 434/43; 434/307 R; 348/121; 352/85; 353/30; 359/630
[58] Field of Search .............................. 434/38, 44, 43, 434/68, 307 R, 308, 365, 20, 27, 29; 348/61, 117, 121, 744; 345/8, 9; 352/85; 353/30; 359/630

[56] References Cited

U.S. PATENT DOCUMENTS

| | | |
|---|---|---|
| 3,514,871 | 5/1967 | Tucker ........................................ 434/44 |
| 4,127,322 | 11/1978 | Jacobson et al. . |
| 4,246,605 | 1/1981 | La Russa . |
| 4,295,159 | 10/1981 | Carollo et al. . |
| 4,348,186 | 9/1982 | Harvey et al. ............................. 434/44 |
| 4,352,664 | 10/1982 | Morrison et al. . |
| 4,634,384 | 10/1987 | Neves et al. . |
| 4,775,859 | 10/1988 | Starkey, IV et al. . |
| 5,136,675 | 8/1992 | Hodson ................................. 359/630 X |
| 5,210,626 | 5/1993 | Kumayama et al. ..................... 345/9 X |
| 5,242,306 | 9/1993 | Fisher . |
| 5,320,534 | 6/1994 | Thomas . |
| 5,320,538 | 6/1994 | Baum . |

Primary Examiner—Joe Cheng
Attorney, Agent, or Firm—Bell, Seltzer, Park & Gibson

[57] ABSTRACT

A visual display system and method according to the present invention includes an inset image generator for producing video signals representative of a plurality of inset images and an inset image projection means for generating a plurality of inset images, each having a smaller size and a higher resolution than a background image, in response to the video signals. The inset image projection means includes an inset image projector having a number of video lines and dividing means for dividing the plurality of video lines into a number of subraster blocks, each of which can generate an inset image. Each subraster block is individually positioned by deflection means such that the high resolution of inset images can be individually positioned relative to the background image. In addition, the visual display system and method includes an inset image processor including allocation means for assigning the video signals representative of each individual inset image to an individual subraster block and, in some embodiments, assigning the video signals based upon a predetermined priority allocation criteria such that only predetermined ones of the inset images are displayed.

23 Claims, 2 Drawing Sheets

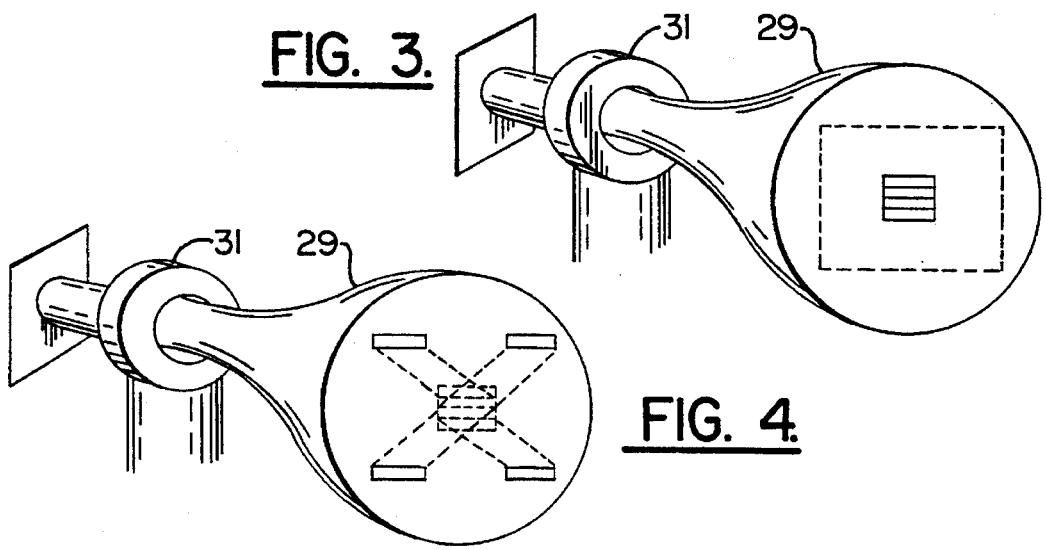
FIG. 3.
FIG. 4.
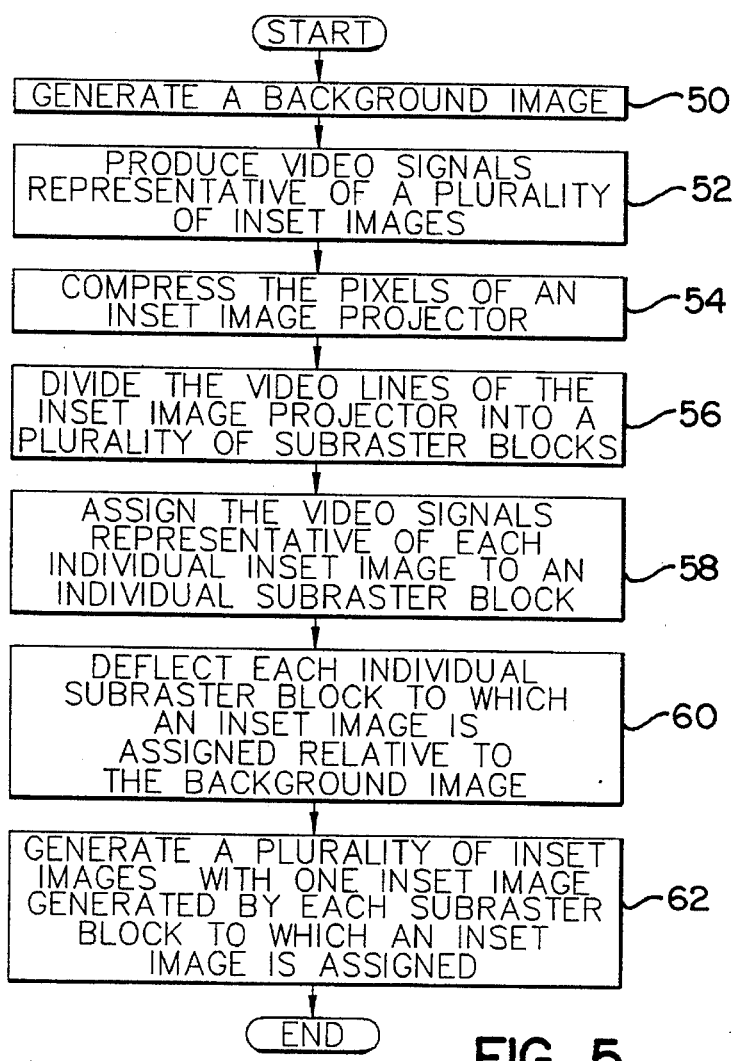
FIG. 5.

VIDEO DISPLAY SYSTEM AND METHOD FOR GENERATING AND INDIVIDUALLY POSITIONING HIGH RESOLUTION INSET IMAGES

FIELD OF THE INVENTION

The present invention relates generally to visual display systems and methods and, more particularly, to visual simulation methods and systems.

BACKGROUND OF THE INVENTION

Visual display systems, such as flight simulation systems, are commonly employed to train military, commercial and other personnel. Conventional visual display systems include one or more screens onto which a video image is projected by one or more projectors, such as cathode ray tubes (CRTs). The operator of the visual display system is also generally provided with a control panel and, in some instances, a joystick for providing input to the visual display system in response to the displayed video image. Thus, the operator can simulate the flight of an aircraft, for example, and can respond to the environment as depicted by the visual display.

In conventional flight simulation systems in which a full color video image is displayed, one projector, generally termed an RGB projection, is typically associated with each screen of the visual display system to project the red, green and blue color components of the video image on the associated screen. A typical RGB projector produces video images, each of which consist of a predetermined number of video lines, and each line of which consists of a predetermined number of picture elements, or pixels. For example, a conventional projector produces 1,024 video lines, each consisting of 1,280 pixels. In addition, the video images are produced at a predetermined frequency or frame rate, such as 30 or 60 hertz.

In order to provide a relatively large display for the operator, the video image produced by the projector of a conventional flight simulation system is generally expanded and displayed upon a screen having a much larger surface area than the surface of the projector. For example, each optical line pair of a conventional projector generally defines a projection angle of 12 to 18 arcminutes. Thus, while a relatively large image is displayed for the operator, the resolution of the image is somewhat diminished by the expansion of the video image.

In order to improve the resolution of one portion of the projected video image, systems and methods have been developed to inset a high resolution video image into the displayed video image or background image. The high resolution inset image is generally relatively small and is, for example, positioned at an area of interest. Typically, a portion of the background image is removed or blanked at the area of interest at which the inset image will be displayed. The portion of the video display, from which the background image is blanked, is then replaced with the high resolution inset image. The inset image is generally produced by another projector. The projector which produces the inset image can be an RGB projector to produce a full color inset image, or a monochrome projector which produces a single color inset image.

For example, as disclosed in U.S. Pat. No. 5,242,306 which issued Sep. 7, 1993 to Ralph W. Fisher (hereinafter the "'306 patent"), a video graphic system for producing a wide field color display is disclosed in which an inset area of interest of relatively high resolution is provided in the wide field color display of somewhat lower resolution. According to the video graphic system of the '306 patent, only one color, such as green, for example, is blanked from the background image at the area of interest. A high resolution inset image is then projected to fill the inset area of interest. The inset image is produced by a monochrome projector which produces an inset image in the single color, such as green, which was blanked from the background image. Since only one color is blanked from the background image at the area of interest the remaining two colors of the background image are projected in the area of interest along with the monochromatic inset image. The video graphic system of the '306 patent, however, only provides one high resolution inset image at a single area of interest within the background image.

SUMMARY OF THE INVENTION

In view of the foregoing background, it is therefore an object of the present invention to provide an improved method and system for providing a video display having an inset image of relatively high resolution and a background image of somewhat lower resolution.

It is also an object of the present invention to provide a method and system for providing a number of inset images having a relatively high resolution and a background image of somewhat lower resolution.

These and other objects are provided, according to the present invention, by a visual display system and method which generates both a background image having a predetermined size and resolution and a plurality of inset images, each having a smaller size and a higher resolution than the background image and each being individually positioned relative to the background image to thereby provide a plurality of detailed inset images for each frame of the background image. The visual display system includes both a background image projection means for generating the background image and an inset image generation means for producing video signals representative of a plurality of inset images. The visual display system also includes inset image projection means for generating the plurality of inset images in response to the video signals produced by the inset image generation means.

More particularly, the inset image projection means includes an inset image projector having a plurality of video lines and dividing means, associated with the inset image projector, for dividing the plurality of video lines into a plurality of subraster blocks and, preferably, a predetermined number of substrate blocks. Each subraster block includes a predetermined number of video lines from which one inset image can be generated.

The generation of inset images by the inset image projection means is controlled by an inset image processing means which includes allocation means for assigning the video signals representative of each individual inset image to a subraster block, and deflection means for producing positioning signals corresponding to the individual positions of each of the subraster blocks to which an inset image is assigned. Thus, the positions of each inset image relative to the background image can be individually controlled by the visual display system and method of the present invention.

Each video line of the inset image projector is preferably comprised of a predetermined number of picture elements or pixels. In order to generate an inset image having a smaller size and a higher resolution than the background image, the visual display system preferably includes converging means for compressing the pixels. The inset image projection means can also include blanking means for blanking the inset image projector while a subraster block is positioned relative to the background image by the deflection means. Thus, the inset image is only displayed once it has been properly positioned relative to the background image.

In one embodiment, the inset image generation means also produces a periodic video synchronization signal. In this embodiment, the visual display system and method further includes synchronization means for synchronizing the generation of the background image and the plurality of inset images relative to the periodic video synchronization signal.

In another embodiment, the deflection means of the inset image processing means can also include means for tracking the line of site of an operator of the visual display system. Thus, at least one inset image is positioned in the line of sight of the viewer.

In still another embodiment, the allocation means of the inset image processing means preferably includes prioritizing means for assigning a priority to each inset image based upon a predetermined priority allocation criteria. Thus, only the number of inset images which are equal to the predetermined number of subraster blocks and which have the highest priorities are assigned to an individual subraster block and thereafter displayed.

The visual display system of one embodiment of the present invention includes a plurality of display screens for displaying the background image and the plurality of inset images generated by the background image projection means and the inset image projection means, respectively. In this embodiment, the inset image projection means preferably includes a plurality of projectors and associated dividing means such that at least one projector is associated with each screen. Further, the inset image processing means of this embodiment preferably includes control means for enabling only one of the plurality of projectors at any one time. Thus, only the one enabled projector can generate an inset image for display on an associated screen in response to the video signals produced by the inset image generation means.

The inset image processing means of this embodiment can also include interleaving means for generating a first inset image with a first projector for display on an associated first screen while simultaneously positioning a subraster block to which a second inset image is assigned for subsequent display by a second projector on an associated second screen. Thus, the plurality of inset images can be efficiently displayed by simultaneously displaying one inset image while positioning a subraster block to which another, subsequently displayed, inset image is assigned.

Therefore, according to the visual display system and method of the present invention, a background image and a plurality of inset images can be displayed. Each of the plurality of inset images has a higher resolution than the background image and can be individually positioned relative to the background image. In addition, the video signals representative of the plurality of inset images can be displayed according to a predetermined priority allocation criteria, such as relative distance from the operator of the visual display system, to further improve the operation of the visual display system and method.

The foregoing and other advantages and features of the invention, and the manner in which the same are accomplished, will become more readily apparent upon consideration of the following detailed description of the invention taken in conjunction with the accompanying drawings, which illustrate preferred and exemplary embodiments, and wherein:

BRIEF DESCRIPTION OF THE DRAWINGS

FIG. 3 is a perspective view of the inset image projector of the present invention illustrating the compression of the picture elements and the division of those picture elements into a plurality of subraster blocks;

FIG. 4 is a perspective view of the inset image projector of FIG. 3 illustrating the individual deflection of each of the subraster blocks; and FIG. 5 illustrates detailed operations for displaying a plurality of high resolution inset images relative to a background image according to the present invention.

DETAILED DESCRIPTION OF THE PREFERRED EMBODIMENTS

The present invention will now be described more fully hereinafter with reference to the accompanying drawings, in which a preferred embodiment of the invention is shown. This invention may, however, be embodied in many different forms and should not be construed as limited to the embodiments set forth herein; rather, this embodiment is provided so that this disclosure will be thorough and complete and will fully convey the scope of the invention to those skilled in the art. Like numbers refer to like elements throughout.

Figure 1:
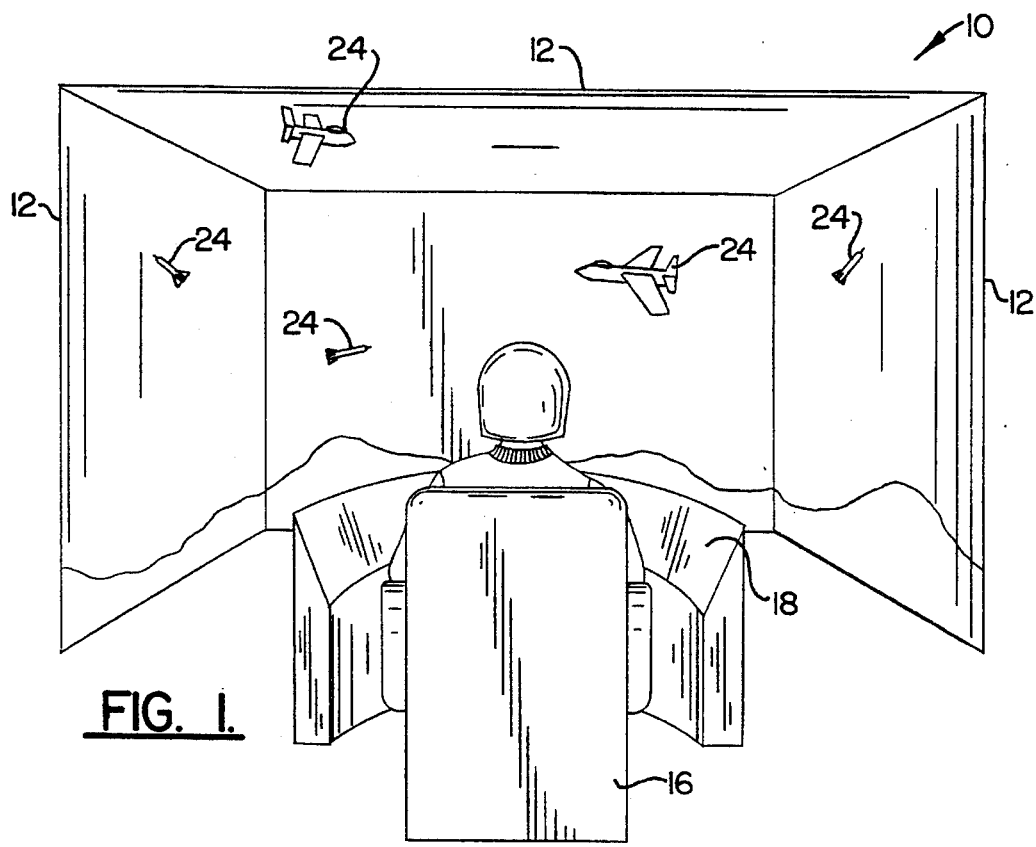
FIG. 1 is a perspective view illustrating a visual display system of the present invention which displays both a background image and a plurality of high resolution inset images.

Referring now to FIG. 1, a visual display system 10 according to the present invention is illustrated. As illustrated, the visual display system can be a flight simulation system which is employed to train military, commercial or other personnel to fly aircraft and to appropriately respond to particular flight situations. However, the visual display system can also be employed to simulate other environments and to train other personnel for other operations without departing from the spirit and scope of the present invention. Further, although the visual display system is illustrated and described below in detail with respect to a flight simulation system which includes plurality of display screens 12, the visual display system of the present invention need not include a plurality of display screens, but can include only one display screen without departing from the spirit and scope of the present invention.

As illustrated in FIG. 1, a visual display system 10, such as a flight simulation system, which includes a plurality of display screens 12 is shown. For example, the visual display system can include an out-the-window flight simulation system such as the Virtual Dome™ visual display system manufactured by McDonnell Douglas Corporation, the assignee of the present application. As also shown in FIG. 1, an operator sits on a viewing platform 16 and responds to the displayed video image via controls provided on a control panel 18. These controls may include, for example, a joystick for positioning a simulated aircraft relative to the displayed background image. The controls may also provide information to the operator regarding the status of the simulated aircraft and the navigational conditions.

Figure 2:
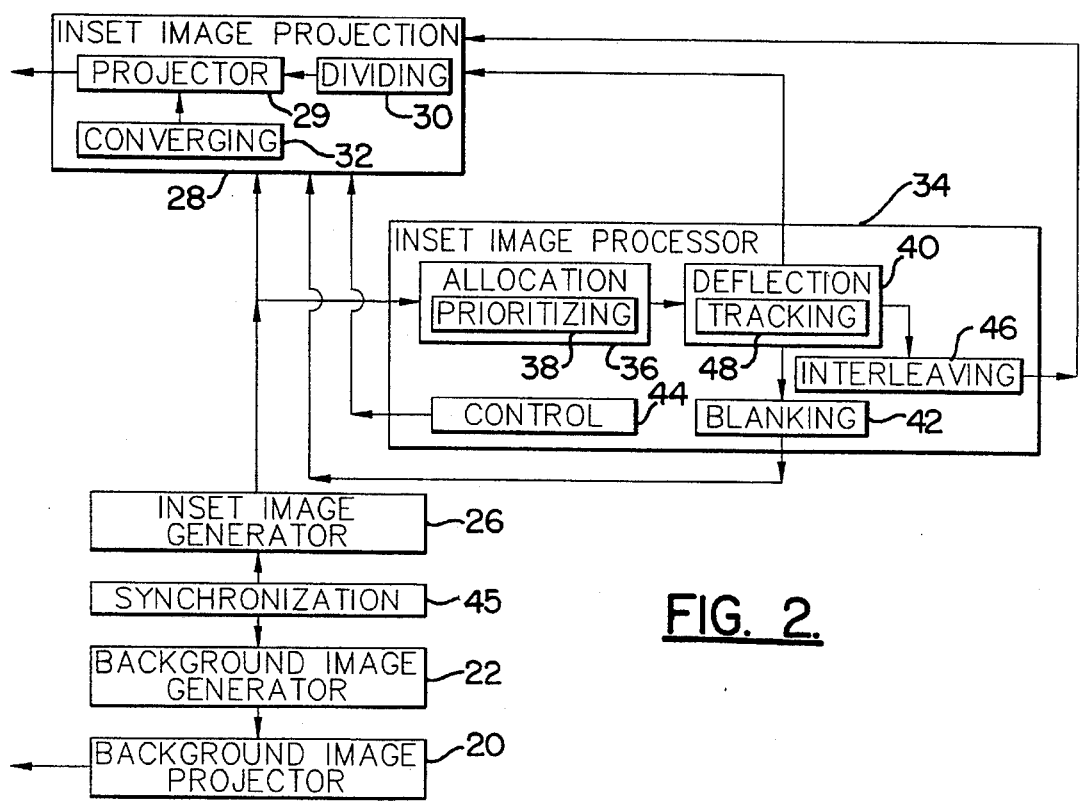
FIG. 2 is a schematic block diagram of the visual display system of the present invention.

As also illustrated in FIG. 1, the image displayed on the display screens 12 includes a background image having a predetermined size and resolution. The background image is generally generated by a background image projection means 20 as shown in FIG. 2 and block 50 of FIG. 5. The background image projection means preferably includes a background image projector and, more particularly, a plurality of background image projectors, at least one of which is associated with each display screen. For full color background images, the background image projectors are generally RGB projectors, such as BARCO 1208 projectors or Ampro 3300 projectors, which project a background image having red, green and blue color components. However, a monochrome background image projector which produces a monochromatic background image can also be employed without departing from the spirit and sign of the present invention.

As known to those skilled in the art, the background image projection means 20 is driven by an image generation system 22, some of which are described in a book entitled, *Fundamentals of Interactive Computer Graphics* by Foley et al. which was published by Addison-Wesley Publishing Company in 1982. Accordingly, the background image projection produces the frames of video images which form the background image at a predetermined frequency or frame rate such as 60 hertz.

As also known to those skilled in the art, each background projector 20 includes a predetermined number of video lines, each of which is comprised of a predetermined number of picture elements or pixels. In order to display a relatively large background image for the operator, the individual pixels are projected, and thereby expanded, for display on the associated display screen 12. For example, each pair of video lines typically defines a projection angle of 12 to 18 lines typically defines a projection angle of 12 to 18 arc-minutes. Therefore, the resulting background image displayed on the display screens has a relatively low resolution.

As illustrated in FIG. 1, a plurality of inset images 24 can also be displayed on the display screen. As shown, the inset images can include other aircraft or targets, such as missiles, in which the operator is particularly interested. According to the present invention, each inset image has a smaller size and a higher resolution than the background image in order to provide the operator with additional detail in these particular areas of interest.

As illustrated schematically in FIG. 2 and by block 52 of FIG. 5, video signals representative of the plurality of inset images are produced by an inset image generation means 26, such as an inset image generator. As described above in conjunction with the background image generator 22, image generation systems are well-known for providing video signals representative of three-dimensional images. The inset image generator, in particular, is adapted to provide frames of video signals representative of the three-dimensional images of the plurality of inset images at a predetermined frame rate, such as 60 hertz, and, preferably at the same frame rate as the video image frames of the background image are generated.

In response to a video signal frame produced by the inset image generation means 26, the inset image projection means 28 can generate a plurality of inset images as shown in block 62 of FIG. 5. Each inset image has a smaller size and a higher resolution than the background image. In particular, the inset image projection means preferably includes an inset image projector 29 having a plurality of video lines, each of which have a predetermined number of pixels. The inset image projector can be a RGB projector for producing a full color image. However, the inset image projector can also be a monochrome projector for projecting an inset image in a single color, such as green, without departing from the spirit and scope of the present invention.

As shown in FIG. 2 and block 56 of FIG. 5, the inset image projection means 28 also preferably includes dividing means 30 for dividing the plurality of video lines into a plurality of subraster blocks. Each subraster block is adapted to generate one inset image. Accordingly, a single inset image projector 29 can produce a plurality of inset images from each frame of video signals, with each inset image generated by a separate subraster block.

The inset image projection means 28 also preferably includes converging means 32 for compressing the pixels such that the resulting inset image has a smaller size and a higher resolution than the background image as illustrated in FIG. 2 and block 54 of FIG. 5. In particular, the converging means preferably includes means for reducing the horizontal and vertical sweeps of the inset image projector 29 by a predetermined amount. For example, as illustrated in FIG. 3, the horizontal and vertical sweeps of the inset image projector can be reduced, such as by a factor of 4, to compress the pixels and to display inset images having a smaller size and higher resolution than the background image.

As known to those skilled in the art, the horizontal and vertical sweeps of a projector, such as the inset image projector 29, are controlled by a raster deflection circuit 31 which controls the sweep of the electron beam across the face of the projector. Thus, by modifying the raster deflection circuit to reduce the horizontal and vertical sweeps of the electron beam, the pixels are compressed.

The visual display system 10 of the present invention also preferably includes inset image processing means 34 for controlling the generation of inset images by the inset image projection means 28. As illustrated in FIG. 2 and block 58 of FIG. 5, the inset image processing means preferably includes allocation means 36 for assigning the video signals representative of each individual inset image to a subraster block of the inset image projector 29.

In one embodiment, the dividing means 30 of the inset image projection means 28 divides the plurality of video lines into a predetermined number of subraster blocks such that each subraster block is comprised of a predetermined number of video lines of the inset image projector. For example, the inset image projector 29 can include 1,024 video lines, each of which includes 1,280 pixels. Accordingly, the video lines can be divided into 10 subraster blocks with each subraster block including approximately 100 video lines.

In this embodiment, the allocation means 36 preferably includes prioritizing means 38 for assigning a priority to each inset image. The priorities are based upon a predetermined priority allocation criteria. Accordingly, only the number of inset images equal to the predetermined number of subraster blocks, such as 10, which have the highest priorities are assigned to an individual subraster block. The remaining, lower priority inset images are therefore either not displayed or the video signals representative of the remaining, lower priority inset images are provided to the background image projector 20 for display as a portion of the lower resolution background image.

The predetermined priority allocation criteria can, for example, be based upon the relative distance of the inset images from the operator. In this example, the 10 nearest inset images would be assigned the 10 highest priorities and would be assigned to individual subraster blocks and subsequently displayed as high resolution inset images by the visual display system 10 of the present invention.

The inset image processing means 34 also includes deflection means 40, responsive to the allocation means 36, for producing positioning signals corresponding to the individual positions of each of the subraster blocks to which an inset image is assigned. Accordingly, each of the subraster blocks can be individually positioned and, consequently, each of the corresponding inset images generated by the subraster blocks can be individually positioned and displayed relative to the background image as shown in FIG. 4 and block 60 of FIG. 5. The positioning signals produced by the deflection means preferably include signals indicative of the X and Y deflection of the subraster block relative to a predetermined position on the surface of the inset image projector 29.

In one preferred embodiment, the visual display system 10 also includes blanking means 42, responsive to the deflection means 40, for blanking the inset image projector 29 while a subraster block is positioned relative to the background image. Thus, an inset image is only displayed by the inset image projector according to this embodiment of the present invention once the subraster block to which the video signals representative of the inset image has been positioned. In addition, the video display system of the present invention preferably includes means for blanking the portion of the background image corresponding to the position of each of the inset images. Thus, conflicting background and inset images are not displayed at the same position of the display screen. For a visual display system which includes an RGB background image projector 20 which generates a full color background image and an RGB inset image projector which generates full color inset images, all three colors of the background image projector are preferably blanked. In embodiments of the visual display system which include a monochrome inset image projector for generating a single color inset image, only the color component generated by the monochrome inset image projector, such as green, is blanked from the background image.

As illustrated in FIG. 1, one embodiment of the visual display system 10 of the present invention includes a plurality of display screens 12, responsive to the background image projection means 20 and the inset image projection means 28, for displaying the background image and a plurality of inset images. According to this embodiment, the inset image projection means includes a plurality of inset image projectors 29, at least one of which is associated with each display screen. Likewise, the background image projection means includes a plurality of background image projectors, at least one of which is associated with each display screen.

In this embodiment, the video signals representative of a plurality of inset images are preferably provided to each of the plurality of inset image projectors 29. In particular, the inset image processing means preferably includes control means 44, including a multiplexor, for enabling only one of the plurality of inset image projectors at a time. Thus, only the one enabled inset image projector will generate an inset image for display on an associated display screen 12 in response to the video signals produced by the inset image generation means 26. Thereafter, another inset image projector can be enabled to display the next inset image of the frame of video signals.

The control means 44 selects the inset image projector 29 to be enabled based upon the predetermined position of the inset image relative to the background image. Thus, if the inset image is to be viewed on the right-hand screen of the multi-screen visual display system 10 of FIG. 1, only the inset image projector associated with the right-hand screen will be enabled to display the inset image.

In operation, a pre-programmed simulation routine is provided to the background image generation means 22 and the inset image generation means 26. Accordingly, the inset image generation means produces frames of video signals representative of a plurality of inset images and the background image generation means produces frames of video signals representative of the background image. As described above, each frame of video signals produced by the inset image generation means can represent a plurality of inset images. Thus, for each frame of video signals representative of a background image, a corresponding frame of video signals representative of a plurality of inset images can be produced. Thus, the visual display system and method of the present invention preferably positions and displays the plurality of inset images of each frame relative to the background image at the same predetermined frequency, such as 60 hertz.

In order to increase the speed and, therefore, the efficiency of the visual display system and method of the present invention, the inset image processing means 34 preferably includes interleaving means 46, responsive to the deflection means 40, for generating a first inset image with a first inset image projector for display on an associated first screen while simultaneously positioning a subraster block to which a second inset image is assigned for subsequent display by a second inset image projector on an associated second screen. Therefore, the video signals representative of the first inset image can be scanned from the inset image generation means 26 by the first inset image projection means while the subraster block to which the second inset image is assigned is positioned. Thereafter, the video signals representative of the second inset image can be scanned from the inset image generation means by the second inset image projection means while a subraster block to which a third inset image is assigned is positioned. In order to provide such simultaneous display and positioning of first and second inset images, the video signals representative of the first and second inset images are preferably assigned, by the allocation means 36, to subraster blocks of different inset image projectors.

In one embodiment, the deflection means 40 includes means 48 for tracking the line-of-sight of an operator of the visual display system. Thus, in this embodiment, the inset image can be positioned in the line-of-sight of the viewer. Typically, the means for tracking the line of sight of the operator includes a head tracking system, such as known to those skilled in the art.

In addition, the visual display system and method of the present invention can include a filter disposed between each inset image projector 29 and the associated display screens 12. Typically, the filter is a high pass filter having a cut-off frequency of approximately 660 nanometers such that the resulting inset image is barely visible as a generally reddish haze to the unaided eye. However, when viewed through night vision goggles, the resulting inset image is within the predetermined frequency range of the goggles such that the operator can readily view the inset image. In this embodiment, the background image projectors 20 are typically configured to display a nighttime background image as known to those skilled in the art while the inset image projectors are configured to display inset images according to a full intensity daytime mode.

Therefore, according to the visual display system and method of the present invention, a background image and a plurality of inset images can be displayed. Each of the plurality of inset images has a higher resolution than the background image and can be individually positioned relative to the background image. In addition, the video signals representative of the plurality of inset images can be displayed according to a predetermined priority allocation criteria, such as relative distance from the operator of the visual display system, to further improve the operation of the visual display system and method.

In the drawings and the specification, there has been set forth preferred embodiments of the invention and, although specific terms are employed, the terms are used in a generic and descriptive sense only and not for purpose of limitation, the scope of the invention being set forth in the following claims.

That which is claimed is:

1. A visual display system comprising:
   background image projection means for generating a background image having a predetermined size and resolution;
   inset image generation means for producing video signals representative of a plurality of inset images;
   inset image projection means, responsive to said inset image generation means, for generating a plurality of inset images, each having a smaller size and a higher resolution than the background image, in response to the video signals produced by said inset image generation means, said inset image projection means including:
   an inset image projector having a plurality of video lines; and
   dividing means for dividing the plurality of video lines into a plurality of subraster blocks wherein each subraster block can generate an inset image; and
   inset image processing means, responsive to said inset image generation means, for controlling the generation of inset images by said inset image projection means, said inset image processing means including: allocation means for assigning the video signals representative of each individual inset image to an individual subraster blocks of said inset image projector; and deflection means, responsive to said allocation means, for producing positioning signals corresponding to the individual positions of each of the subraster blocks to which an inset image is assigned by said allocation means relative to the background image.

2. A visual display system according to claim 1 wherein each video line is comprised of a predetermined number of pixels, and wherein said inset image projection means further comprises converging means for reducing the size of the pixels such that the resulting inset image has a smaller size and higher resolution than the background image.

3. A visual display system according to claim 1 further comprising a plurality of display screens, responsive to said background image projection means and said inset image projection means, for displaying the background image and the plurality of inset images.

4. A visual display system according to claim 3 wherein said inset image projection means further comprises a plurality of inset image projectors and associated dividing means, wherein at least one inset image projector is associated with each screen.

5. A visual display system according to claim 4 wherein said inset image processing means further comprises control means for enabling only one of said plurality of inset image projectors such that only the one enabled inset image projector generates an inset image for display on said associated screen in response to the video signals produced by said inset image projection means.

6. A visual display system according to claim 4 wherein said inset image processing means further comprises interleaving means, responsive to said deflection means, for generating a first inset image with a first inset image projector for display on an associated first screen while simultaneously positioning a subraster block to which a second inset image is assigned for subsequent display by a second inset image projector on an associated second screen.

7. A visual display system according to claim 1 wherein said inset image projection means further comprises blanking means, responsive to said deflection means, for blanking said inset image projector while a subraster block is positioned relative to the background image.

8. A visual display system according to claim 1 wherein said inset image projection means also produces a periodic video synchronization signal and wherein the visual display system further comprises synchronization means, responsive to periodic video synchronization signals, for synchronizing the generation of the background image and the generation of the plurality of inset images.

9. A visual display system according to claim 1 wherein said dividing means divides the plurality of video lines into a predetermined number of subraster blocks, each subraster block comprised of a predetermined number of video lines of said inset image projector, and wherein said allocation means includes prioritizing means for assigning a priority to each inset image based upon a predetermined priority allocation criteria such that only the number of inset images equal to the predetermined number of subraster blocks which have the highest priorities are assigned to an individual subraster block.

10. A visual display system according to claim 1 wherein said deflection means comprises means for tracking the line-of-sight of an operator of the visual display system such that at least one inset image is positioned in the line-of-sight of the viewer.

11. A flight simulation system comprising:
    background image projection means for generating a background image having a predetermined size and resolution;
    inset image generation means for producing video signals representative of a plurality of inset images;
    inset image projection means, responsive to said inset image generation means, for generating a plurality of inset images, each having a smaller size and a higher resolution than the background image, in response to the video signals produced by said inset image generation means, said inset image projection means including:
    an inset image projector having a plurality of video lines, each video line being comprised of a predetermined number of pixels;
    converging means for reducing the size of the pixels such that the resulting inset image has a smaller size and higher resolution than the background image;
    dividing means for dividing the plurality of video lines into a plurality of subraster blocks wherein each subraster block can generate an inset image; and
    inset image processing means, responsive to said inset image generation means, for controlling the generation of inset images by said inset image projection means, said inset image processing means including: allocation means for assigning the video signals representative of each individual inset image to an individual subraster blocks of said inset image projector; and deflection means, responsive to said allocation means, for producing positioning signals corresponding to the individual positions of each of the subraster blocks to which an inset image is assigned by said allocation means relative to the background image.

12. A flight simulation system according to claim 11 further comprising a plurality of display screens, responsive to said background image projection means and said inset image projection means, for displaying the background image and the plurality of inset images, and wherein said inset image projection means comprises a plurality of inset image projectors and associated dividing means, wherein at least one inset image projector is associated with each display screen.

13. A flight simulation system according to claim 12 further comprising control means for enabling only one of said plurality of inset image projectors such that only the one enabled projector generates an inset image for display on said associated display screen in response to the video signals produced by said inset image projection means.

14. A flight simulation system according to claim 12 wherein said inset image processing means further comprises interleaving means, responsive to said deflection means, for generating a first inset image with a first inset image projector for display on an associated first screen while simultaneously positioning a subraster block to which a second inset image is assigned for subsequent display by a second inset image projector on an associated second screen.

15. A flight simulation system according to claim 11 wherein said inset image projection means further comprises blanking means, responsive to said deflection means, for blanking said inset image projector while a subraster block is positioned relative to the background image.

16. A flight simulation system according to claim 11 wherein said dividing means divides the plurality of video lines into a predetermined number of subraster blocks, each subraster block comprised of a predetermined number of video lines of said inset image projector, and wherein said allocation means includes prioritizing means for assigning a priority to each inset image based upon a predetermined priority allocation criteria such that only the number of inset images equal to the predetermined number of subraster blocks which have the highest priorities are assigned to an individual subraster block.

17. A method of displaying a composite video image having a plurality of inset images and a background image wherein the inset images are smaller and of a higher resolution than the background image, the method comprising the steps of:

generating a background image having a predetermined size and resolution;

producing video signals representative of a plurality of inset images, each having a smaller size and a higher resolution than the background image;

dividing the plurality of video lines of an inset image projector into a plurality of subraster blocks;

assigning the video signals representative of each individual inset image to an individual subraster block;

generating a plurality of inset images in response to the assigned video signals wherein one inset image is generated by each subraster block; and deflecting each individual subraster blocks relative to the background image.

18. A method according to claim 17 wherein each video line is comprised of a predetermined number of pixels and wherein the method further comprises the step of reducing the size of the pixels such that the resulting inset image has a smaller size and a higher resolution than the background image.

19. A method according to claim 17 wherein the plurality of inset images are generated by a plurality of inset image projectors, and wherein the method further comprises the step of enabling only one of the plurality of inset image projectors such that only the one enabled inset image projector generates an inset image in response to the video signals.

20. A method according to claim 19 further comprising the steps of:

generating a first inset image with a first inset image projector for displaying on the first associated display screen; and simultaneously positioning a subraster block to which a second inset image is assigned for subsequent display by a second inset image projector on an associated second display screen.

21. A method according to claim 17 further comprising the step of blanking the inset image projector while a subraster block is positioned relative to the background image.

22. A method according to claim 17 further comprising the step of synchronizing the generation of the plurality of inset images to the generation of the background image.

23. A method according to claim 17 further comprising the steps of:

dividing the plurality of video lines into a predetermined number of subraster blocks, each subraster block being comprised of a predetermined number of video lines of the projector; and assigning a priority to each inset image based upon a predetermined priority allocation criteria such that only the number of inset images equal to the predetermined number of subraster blocks which have the highest priorities are assigned to an individual subraster block.

* * * * *